(12) United States Patent
Hendry

(10) Patent No.: US 12,389,021 B2
(45) Date of Patent: Aug. 12, 2025

(54) IMAGE DECODING METHOD AND DEVICE FOR SAME

(71) Applicant: LG ELECTRONICS INC., Seoul (KR)

(72) Inventor: Hendry Hendry, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 87 days.

(21) Appl. No.: 17/918,081

(22) PCT Filed: Apr. 12, 2021

(86) PCT No.: PCT/KR2021/004562
§ 371 (c)(1),
(2) Date: Oct. 10, 2022

(87) PCT Pub. No.: WO2021/206524
PCT Pub. Date: Oct. 14, 2021

(65) Prior Publication Data
US 2023/0164334 A1 May 25, 2023

Related U.S. Application Data

(60) Provisional application No. 63/008,666, filed on Apr. 11, 2020.

(51) Int. Cl.
*H04N 19/30* (2014.01)
*H04N 19/107* (2014.01)
(Continued)

(52) U.S. Cl.
CPC ........... *H04N 19/30* (2014.11); *H04N 19/107* (2014.11); *H04N 19/172* (2014.11); *H04N 19/593* (2014.11); *H04N 19/70* (2014.11)

(58) Field of Classification Search
None
See application file for complete search history.

(56) References Cited

U.S. PATENT DOCUMENTS

| 2014/0192897 A1* | 7/2014 | Wang | H04N 19/70 |
| | | | 375/240.25 |
| 2023/0007309 A1* | 1/2023 | Wang | H04N 19/184 |

FOREIGN PATENT DOCUMENTS

KR 10-2018-0019557 A 2/2018

OTHER PUBLICATIONS

Benjamin Bross et al., "Versatile Video Coding (Draft 8)", JVET-Q2001-vE, Joint Video Experts Team (JVET) of ITU-T SG 16 WP 3 and ISO/IEC JTC 1/SC 29/WG 11, 17th Meeting: Brussels, BE, pp. 1-481, Mar. 12, 2020, see pp. 4-5 and 34-374.

(Continued)

*Primary Examiner* — Clifford Hilaire
(74) *Attorney, Agent, or Firm* — Bryan Cave Leighton Paisner LLP

(57) ABSTRACT

An image decoding method performed by a decoding device according to the present disclosure is characterized by comprising the steps of: acquiring a bitstream for a Coded Video Sequence (CVS) including a Coded Video Sequence Start (CVSS) Access Unit (AU); deriving image information about the current picture of the CVSS AU on the basis of the bitstream; and decoding the current picture on the basis of the image information, wherein the CVSS AU only includes a Picture Unit (PU) for an independent layer of the bitstream.

5 Claims, 8 Drawing Sheets

(51) Int. Cl.
      *H04N 19/172*    (2014.01)
      *H04N 19/593*    (2014.01)
      *H04N 19/70*     (2014.01)

(56) References Cited

OTHER PUBLICATIONS

Vadim Seregin et al., "AHG8: On CVSS AU", JVET-R0274, Joint Video Experts Team (JVET) of ITU-T SG 16 WP 3 and ISO/IEC JTC 1/SC 29/WG 11, 18th Meeting: by teleconference, pp. 1-3, Apr. 4, 2020, see pp. 1-3.

Ye-Kui Wang, "AHG8/AHG9: On IRAP and GDR AUs", JVET-R0065-v1, Joint Video Experts Team (JVET) of ITU-T SG 16 WP 3 and ISO/IEC JTC 1/SC 29/WG 11, 18th Meeting: by teleconference, pp. 1-3, Apr. 2, 2020, see pp. 1-3.

Hendry, "AHG9: On signalling recovery point picture", JVET-R0192, Joint Video Experts Team (JVET) of ITU-T SG 16 WP 3 and ISO/IEC JTC 1/SC 29/WG 11, 18th Meeting: by teleconference, pp. 1-4, Apr. 3, 2020, see pp. 1-3.

\* cited by examiner

IMAGE DECODING METHOD AND DEVICE FOR SAME

CROSS-REFERENCE TO RELATED APPLICATIONS

This application is a National Stage Application of International Application No. PCT/KR2021/004562, filed on Apr. 12, 2021, which claims the benefit of and priority to U.S. Provisional Application No. 63/008,666, filed on Apr. 11, 2020, which are hereby incorporated by reference in their entirety for all purposes as if fully set forth herein.

TECHNICAL FIELD

The present disclosure relates to video coding technology, and more particularly, to a video decoding method and apparatus for handling CVSS AU in a video coding system.

BACKGROUND ART

Recently, demand for high-resolution, high-quality images, such as High Definition (HD) images and Ultra High Definition (UHD) images, has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high-resolution and high-quality images.

DISCLOSURE

Technical Problem

The present disclosure provides a method and apparatus for improving image coding efficiency.

The present disclosure provides a method and an apparatus for handling CVSS AU.

Technical Solution

According to an embodiment of the present disclosure, an image decoding method performed by a decoding apparatus is provided. The method comprises obtaining a bitstream for a Coded Video Sequence (CVS) including a Coded Video Sequence Start (CVSS) Access Unit (AU), deriving image information for a current picture of the CVSS AU based on the bitstream, and decoding the current picture based on the image information, wherein the CVSS AU includes only a picture unit (PU) for an output layer of an output layer set (OLS) of the CVS.

According to another embodiment of the present disclosure, a decoding apparatus for performing image decoding is provided. The decoding apparatus comprises an entropy decoder for obtaining a bitstream for a Coded Video Sequence (CVS) including a Coded Video Sequence Start (CVSS) Access Unit (AU) and deriving image information for a current picture of the CVSS AU based on the bitstream and a predictor for decoding the current picture based on the image information, wherein the CVSS AU includes only a picture unit (PU) for an output layer of an output layer set (OLS) of the CVS.

According to another embodiment of the present disclosure, a video encoding method performed by an encoding apparatus is provided. The method comprises decoding a current picture of a Coded Video Sequence Start (CVSS) AU and encoding a bitstream for a Coded Video Sequence (CVS) including the CVSS AU, wherein the CVSS AU includes only a picture unit (PU) for an output layer of an output layer set (OLS) of the CVS.

According to another embodiment of the present disclosure, a video encoding apparatus is provided. The encoding apparatus comprises a predictor for decoding a current picture of a Coded Video Sequence Start (CVSS) AU and an entropy encoder for encoding a bitstream for a Coded Video Sequence (CVS) including the CVSS AU, wherein the CVSS AU includes only a picture unit (PU) for an output layer of an output layer set (OLS) of the CVS.

According to another embodiment of the present disclosure, it is provided a computer-readable digital storage medium in which a bitstream including image information causing an image decoding method to be performed is stored. In the computer-readable digital storage medium, the video decoding method comprises obtaining a bitstream for a Coded Video Sequence (CVS) including a Coded Video Sequence Start (CVSS) Access Unit (AU), deriving image information for a current picture of the CVSS AU based on the bitstream, and decoding the current picture based on the image information, wherein the CVSS AU includes only a picture unit (PU) for an output layer of an output layer set (OLS) of the CVS.

Technical Effects

According to the present disclosure, instead of including PUs of all layers, CVSS AU may not include PUs of layers other than the output layer of OLS, thereby avoiding layer step-wise output.

According to the present disclosure, the PU of the first AU including the PU of the layer for the PU that is not included in the CVSS AU following the CVSS AU that is a GDR AU or an IRAP AU may be a GDR PU or an IRAP PU. In this way, layer step-wise output can be avoided, and the overall coding efficiency can be improved.

DESCRIPTION OF DIAGRAMS

FIG. 1 briefly illustrates an example of a video/image coding system to which embodiments of the present disclosure may be applied.

Figure 4:
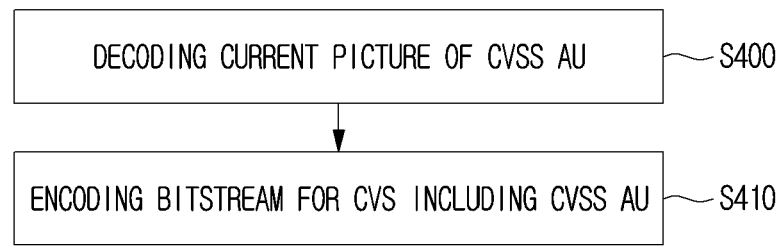

FIG. 4 briefly illustrates an image encoding method performed by an encoding apparatus according to the present disclosure.

Figure 5:
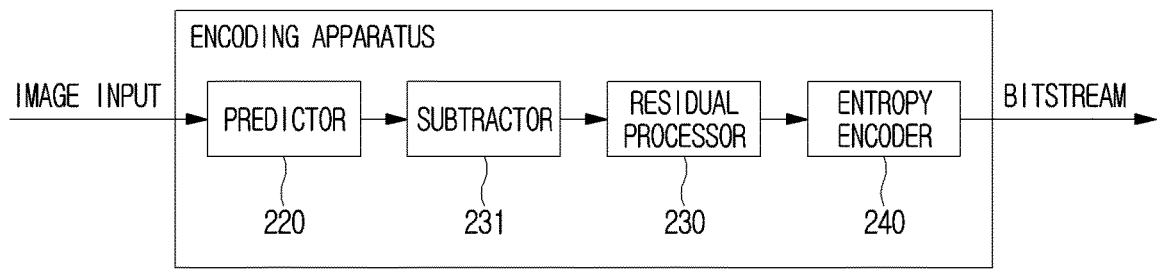

FIG. 5 briefly illustrates an encoding apparatus for performing an image encoding method according to the present disclosure.

Figure 6:
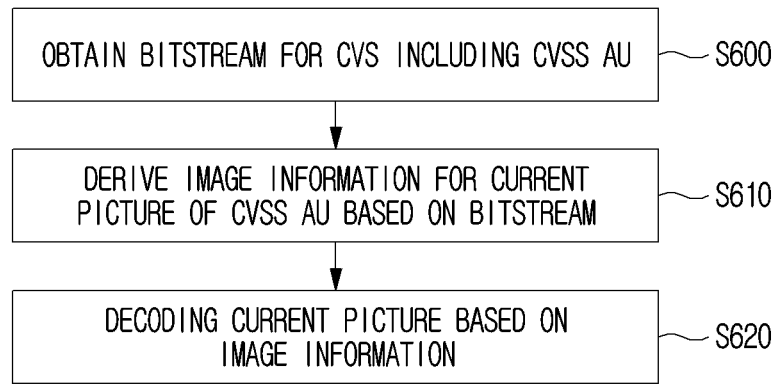

FIG. 6 briefly illustrates an image decoding method performed by a decoding apparatus according to the present disclosure.

Figure 7:
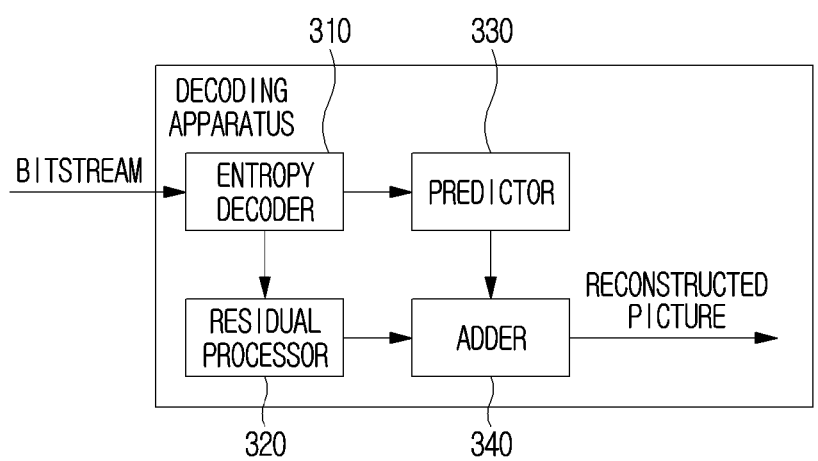

FIG. 7 briefly illustrates a decoding apparatus for performing an image decoding method according to the present disclosure.

Figure 8:
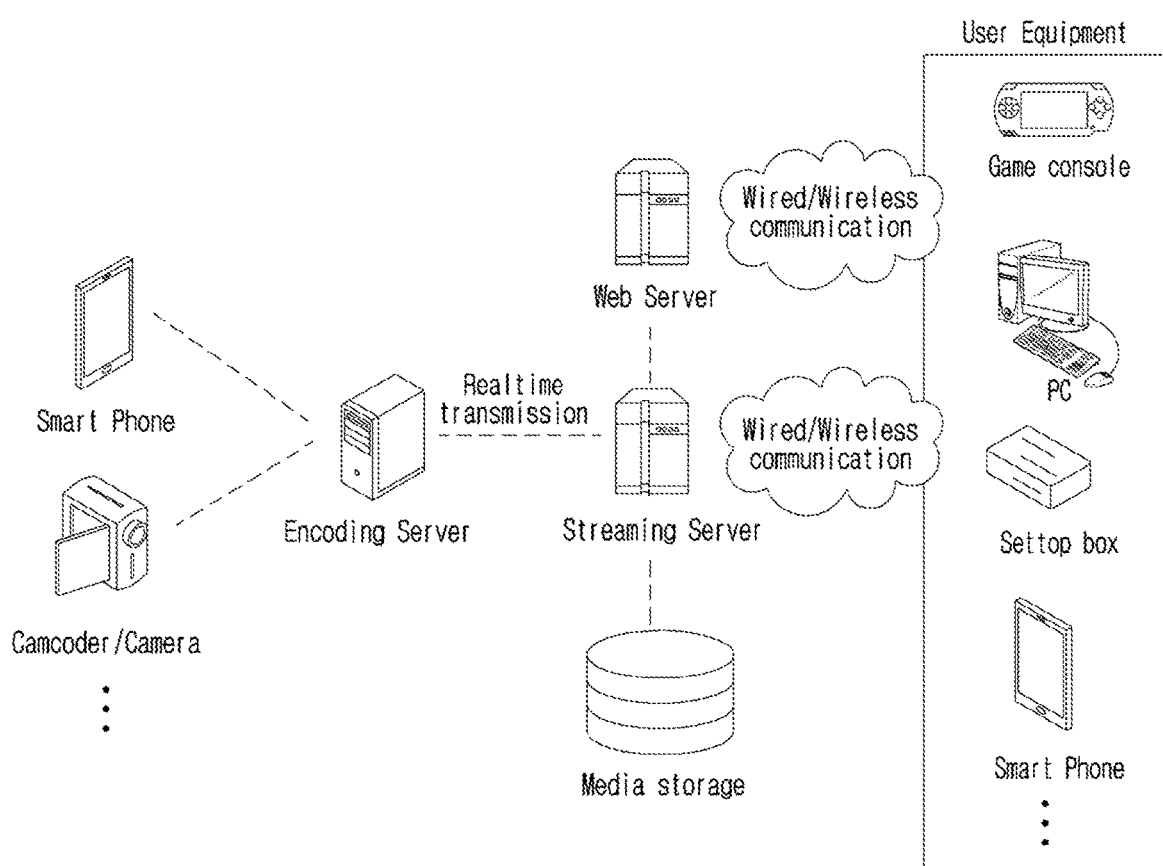

FIG. 8 illustrates a structural diagram of a contents streaming system to which the present disclosure is applied.

BEST MODE

The present disclosure may be modified in various forms, and specific embodiments thereof will be described and illustrated in the drawings. However, the embodiments are not intended for limiting the disclosure. The terms used in the following description are used to merely describe specific embodiments but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it shall be thus understood that the possibility of existence or addition of one or more different features, numbers, steps, operations, elements, components, or combinations thereof is not excluded.

Meanwhile, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be partitioned into plural elements. The embodiments in which the elements are combined and/or partitioned belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

Figure 1:
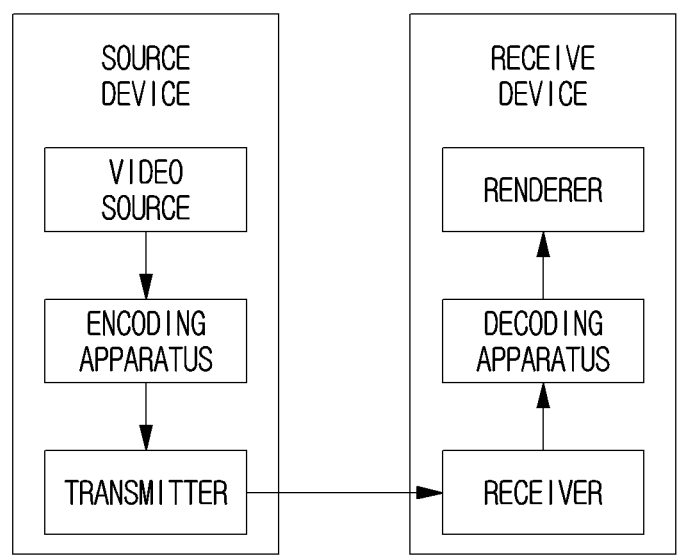

FIG. 1 briefly illustrates an example of a video/image coding device to which embodiments of the present disclosure are applicable.

Referring to FIG. 1, a video/image coding system may include a first device (source device) and a second device (receiving device). The source device may deliver encoded video/image information or data in the form of a file or streaming to the receiving device via a digital storage medium or network.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input image/image. The encoding apparatus may perform a series of procedures such as prediction, transform, and quantization for compression and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

Present disclosure relates to video/image coding. For example, the methods/embodiments disclosed in the present disclosure may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (e.g., H.267 or H.268, etc.).

The present disclosure presents various embodiments of video/image coding, and the embodiments may be performed in combination with each other unless otherwise mentioned.

In the present disclosure, video may refer to a series of images over time. Picture generally refers to a unit representing one image in a specific time zone, and a subpicture/slice/tile is a unit constituting part of a picture in coding. The subpicture/slice/tile may include one or more coding tree units (CTUs). One picture may consist of one or more subpictures/slices/tiles. One picture may consist of one or more tile groups. One tile group may include one or more tiles. A brick may represent a rectangular region of CTU rows within a tile in a picture. A tile may be partitioned into multiple bricks, each of which consisting of one or more CTU rows within the tile. A tile that is not partitioned into multiple bricks may be also referred to as a brick. A brick scan is a specific sequential ordering of CTUs partitioning a picture in which the CTUs are ordered consecutively in CTU raster scan in a brick, bricks within a tile are ordered consecutively in a raster scan of the bricks of the tile, and tiles in a picture are ordered consecutively in a raster scan of the tiles of the picture. In addition, a subpicture may represent a rectangular region of one or more slices within a picture. That is, a subpicture contains one or more slices that collectively cover a rectangular region of a picture. A tile is a rectangular region of CTUs within a particular tile column and a particular tile row in a picture. The tile column is a rectangular region of CTUs having a height equal to the height of the picture and a width specified by syntax elements in the picture parameter set. The tile row is a rectangular region of CTUs having a height specified by syntax elements in the picture parameter set and a width equal to the width of the picture. A tile scan is a specific sequential ordering of CTUs partitioning a picture in which the CTUs are ordered consecutively in CTU raster scan in a tile whereas tiles in a picture are ordered consecutively in a raster scan of the tiles of the picture. A slice includes an integer number of bricks of a picture that may be exclusively contained in a single NAL unit. A slice may consist of either a number of complete tiles or only a consecutive sequence of complete bricks of one tile. Tile groups and slices may be used interchangeably in the present disclosure. For example, in the present disclosure, a tile group/tile group header may be called a slice/slice header.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (e.g., cb, cr) blocks. The unit may be used interchangeably with terms such as block or area in some cases. In a general case, an M×N block may include samples (or sample arrays) or a set (or array) of transform coefficients of M columns and N rows.

In the present description, "A or B" may mean "only A", "only B" or "both A and B". In other words, in the present specification, "A or B" may be interpreted as "A and/or B". For example, "A, B or C" herein means "only A", "only B", "only C", or "any and any combination of A, B and C".

A slash (/) or a comma (comma) used in the present description may mean "and/or". For example, "A/B" may mean "A and/or B". Accordingly, "A/B" may mean "only A", "only B", or "both A and B". For example, "A, B, C" may mean "A, B, or C".

In the present description, "at least one of A and B" may mean "only A", "only B", or "both A and B". In addition, in the present description, the expression "at least one of A or B" or "at least one of A and/or B" may be interpreted the same as "at least one of A and B".

In addition, in the present description, "at least one of A, B and C" means "only A", "only B", "only C", or "any combination of A, B and C". Also, "at least one of A, B or C" or "at least one of A, B and/or C" may mean "at least one of A, B and C".

In addition, parentheses used in the present description may mean "for example". Specifically, when "prediction (intra prediction)" is indicated, "intra prediction" may be proposed as an example of "prediction". In other words, "prediction" in the present description is not limited to "intra prediction", and "intra prediction" may be proposed as an example of "prediction". Also, even when "prediction (i.e., intra prediction)" is indicated, "intra prediction" may be proposed as an example of "prediction".

In the present description, technical features that are individually described within one drawing may be implemented individually or may be implemented at the same time.

The following drawings were created to explain a specific example of the present description. Since the names of specific devices described in the drawings or the names of specific signals/messages/fields are presented by way of example, the technical features of the present description are not limited to the specific names used in the following drawings.

Figure 2:
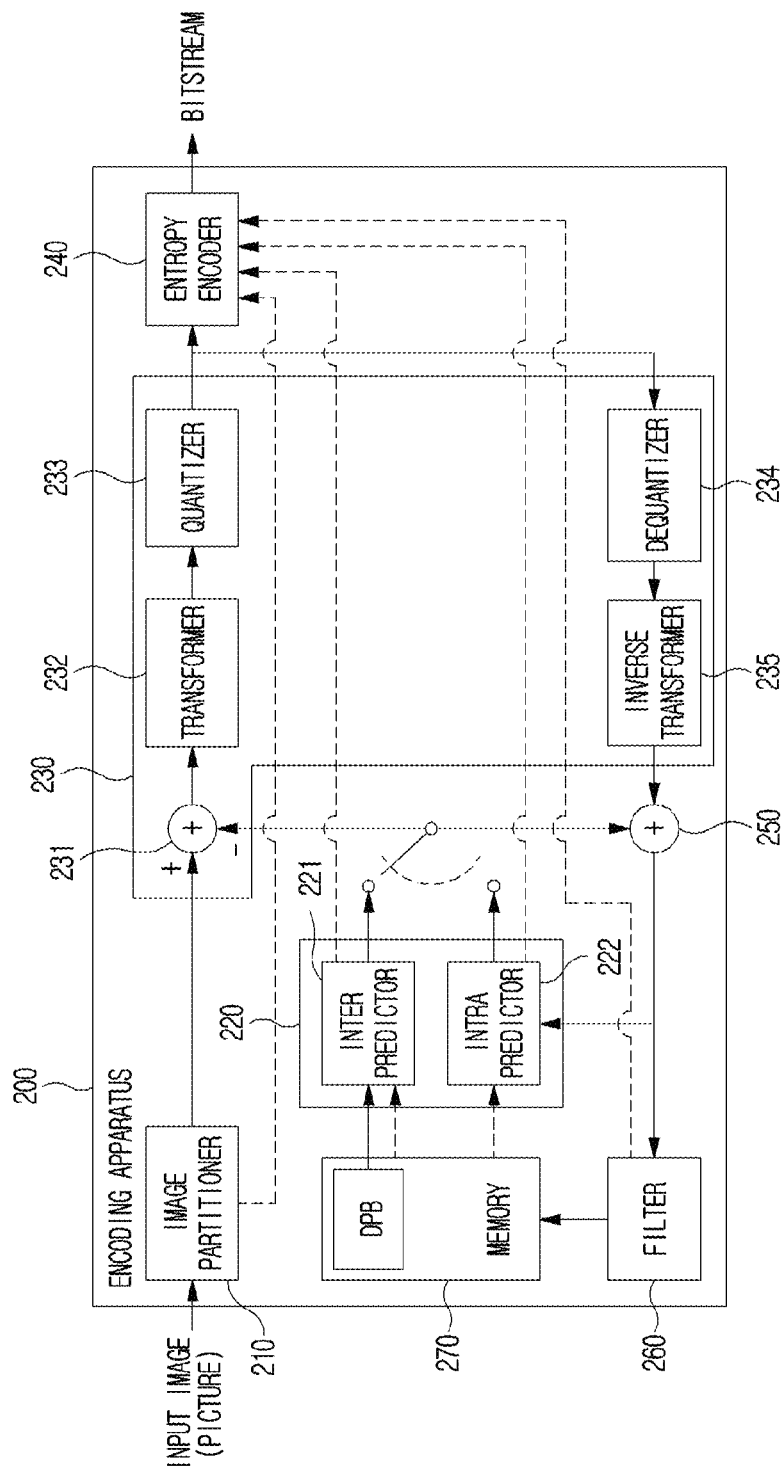
FIG. 2 is a schematic diagram illustrating a configuration of a video/image encoding apparatus to which the embodiments of the present disclosure may be applied.

FIG. 2 is a schematic diagram illustrating a configuration of a video/image encoding apparatus to which the embodiment(s) of the present disclosure may be applied. Hereinafter, the video encoding apparatus may include an image encoding apparatus.

Referring to FIG. 2, the encoding apparatus 200 includes an image partitioner 210, a predictor 220, a residual processor 230, and an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or a reconstructed block generator. The image partitioner 210, the predictor 220, the residual processor 230, the entropy encoder 240, the adder 250, and the filter 260 may be configured by at least one hardware component (e.g., an encoder chipset or processor) according to an embodiment. In addition, the memory 270 may include a decoded picture buffer (DPB) or may be configured by a digital storage medium. The hardware component may further include the memory 270 as an internal/external component.

The image partitioner 210 may partition an input image (or a picture or a frame) input to the encoding apparatus 200 into one or more processors. For example, the processor may be called a coding unit (CU). In this case, the coding unit may be recursively partitioned according to a quad-tree binary-tree ternary-tree (QTBTTT) structure from a coding tree unit (CTU) or a largest coding unit (LCU). For example, one coding unit may be partitioned into a plurality of coding units of a deeper depth based on a quad tree structure, a binary tree structure, and/or a ternary structure. In this case, for example, the quad tree structure may be applied first and the binary tree structure and/or ternary structure may be applied later. Alternatively, the binary tree structure may be applied first. The coding procedure according to the present disclosure may be performed based on the final coding unit that is no longer partitioned. In this case, the largest coding unit may be used as the final coding unit based on coding efficiency according to image characteristics, or if necessary, the coding unit may be recursively partitioned into coding units of deeper depth and a coding unit having an optimal size may be used as the final coding unit. Here, the coding procedure may include a procedure of prediction, transform, and reconstruction, which will be described later. As another example, the processor may further include a prediction unit (PU) or a transform unit (TU). In this case, the prediction unit and the transform unit may be split or partitioned from the aforementioned final coding unit. The prediction unit may be a unit of sample prediction, and the transform unit may be a unit for deriving a transform coefficient and/or a unit for deriving a residual signal from the transform coefficient.

The unit may be used interchangeably with terms such as block or area in some cases. In a general case, an M×N block may represent a set of samples or transform coefficients composed of M columns and N rows. A sample may generally represent a pixel or a value of a pixel, may represent only a pixel/pixel value of a luma component or represent only a pixel/pixel value of a chroma component. A sample may be used as a term corresponding to one picture (or image) for a pixel or a pel.

In the encoding apparatus 200, a prediction signal (predicted block, prediction sample array) output from the inter predictor 221 or the intra predictor 222 is subtracted from an input image signal (original block, original sample array) to generate a residual signal residual block, residual sample array), and the generated residual signal is transmitted to the transformer 232. In this case, as shown, a unit for subtracting a prediction signal (predicted block, prediction sample array) from the input image signal (original block, original sample array) in the encoder 200 may be called a subtractor 231. The predictor may perform prediction on a block to be processed (hereinafter, referred to as a current block) and generate a predicted block including prediction samples for the current block. The predictor may determine whether intra prediction or inter prediction is applied on a current block or CU basis. As described later in the description of each prediction mode, the predictor may generate various information related to prediction, such as prediction mode information, and transmit the generated information to the entropy encoder 240. The information on the prediction may be encoded in the entropy encoder 240 and output in the form of a bitstream.

The intra predictor 222 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra predictor 222 may determine the prediction mode applied to the current block by using a prediction mode applied to a neighboring block.

The inter predictor 221 may derive a predicted block for the current block based on a reference block (reference sample array) specified by a motion vector on a reference picture. Here, in order to reduce the amount of motion information transmitted in the inter prediction mode, the motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like, and the reference picture including the temporal neighboring block may be called a collocated picture (colPic). For example, the inter predictor 221 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter predictor 221 may use motion information of the neighboring block as motion information of the current block. In the skip mode, unlike the merge mode, the residual signal may not be transmitted. In the case of the motion vector prediction (MVP) mode, the motion vector of the neighboring block may be used as a motion vector predictor and the motion vector of the current block may be indicated by signaling a motion vector difference.

The predictor 220 may generate a prediction signal based on various prediction methods described below. For example, the predictor may not only apply intra prediction or inter prediction to predict one block but also simultaneously apply both intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The prediction signal generated by the predictor (including the inter predictor 221 and/or the intra predictor 222) may be used to generate a reconstructed signal or to generate a residual signal. The transformer 232 may generate transform coefficients by applying a transform technique to the residual signal. For example, the transform technique may include at least one of a discrete cosine transform (DCT), a discrete sine transform (DST), a Karhunen-loève transform (KLT), a graph-based transform (GBT), or a conditionally non-linear transform (CNT). Here, the GBT means transform obtained from a graph when relationship information between pixels is represented by the graph. The CNT refers to transform generated based on a prediction signal generated using all previously reconstructed pixels. In addition, the transform process may be applied to square pixel blocks having the same size or may be applied to blocks having a variable size rather than square.

The quantizer 233 may quantize the transform coefficients and transmit them to the entropy encoder 240 and the entropy encoder 240 may encode the quantized signal (information on the quantized transform coefficients) and output a bitstream. The information on the quantized transform coefficients may be referred to as residual information. The quantizer 233 may rearrange block type quantized transform coefficients into a one-dimensional vector form based on a coefficient scanning order and generate information on the quantized transform coefficients based on the quantized transform coefficients in the one-dimensional vector form. Information on transform coefficients may be generated. The entropy encoder 240 may perform various encoding methods such as, for example, exponential Golomb, context-adaptive variable length coding (CAVLC), context-adaptive binary arithmetic coding (CABAC), and the like. The entropy encoder 240 may encode information necessary for video/image reconstruction other than quantized transform coefficients (e.g., values of syntax elements, etc.) together or separately. Encoded information (e.g., encoded video/image information) may be transmitted or stored in units of NALs (network abstraction layer) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. In the present disclosure, information and/or syntax elements transmitted/signaled from the encoding apparatus to the decoding apparatus may be included in video/picture information. The video/image information may be encoded through the above-described encoding procedure and included in the bitstream. The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 240 and/or a storage unit (not shown) storing the signal may be included as internal/external element of the encoding apparatus 200, and alternatively, the transmitter may be included in the entropy encoder 240.

The quantized transform coefficients output from the quantizer 233 may be used to generate a prediction signal. For example, the residual signal (residual block or residual samples) may be reconstructed by applying dequantization and inverse transform to the quantized transform coefficients through the dequantizer 234 and the inverse transformer 235. The adder 250 adds the reconstructed residual signal to the prediction signal output from the inter predictor 221 or the intra predictor 222 to generate a reconstructed signal (reconstructed picture, reconstructed block, reconstructed sample array). If there is no residual for the block to be processed, such as a case where the skip mode is applied, the predicted block may be used as the reconstructed block. The adder 250 may be called a reconstructor or a reconstructed block generator. The generated reconstructed signal may be used for intra prediction of a next block to be processed in the current picture and may be used for inter prediction of a next picture through filtering as described below.

Meanwhile, luma mapping with chroma scaling (LMCS) may be applied during picture encoding and/or reconstruction.

The filter 260 may improve subjective/objective image quality by applying filtering to the reconstructed signal. For example, the filter 260 may generate a modified reconstructed picture by applying various filtering methods to the reconstructed picture and store the modified reconstructed picture in the memory 270, specifically, a DPB of the memory 270. The various filtering methods may include, for example, deblocking filtering, a sample adaptive offset, an adaptive loop filter, a bilateral filter, and the like. The filter 260 may generate various information related to the filtering and transmit the generated information to the entropy encoder 240 as described later in the description of each filtering method. The information related to the filtering may be encoded by the entropy encoder 240 and output in the form of a bitstream.

The modified reconstructed picture transmitted to the memory 270 may be used as the reference picture in the inter predictor 221. When the inter prediction is applied through the encoding apparatus, prediction mismatch between the encoding apparatus 200 and the decoding apparatus 300 may be avoided and encoding efficiency may be improved.

The DPB of the memory 270 DPB may store the modified reconstructed picture for use as a reference picture in the inter predictor 221. The memory 270 may store the motion information of the block from which the motion information in the current picture is derived (or encoded) and/or the motion information of the blocks in the picture that have already been reconstructed. The stored motion information may be transmitted to the inter predictor 221 and used as the motion information of the spatial neighboring block or the motion information of the temporal neighboring block. The memory 270 may store reconstructed samples of reconstructed blocks in the current picture and may transfer the reconstructed samples to the intra predictor 222.

Figure 3:
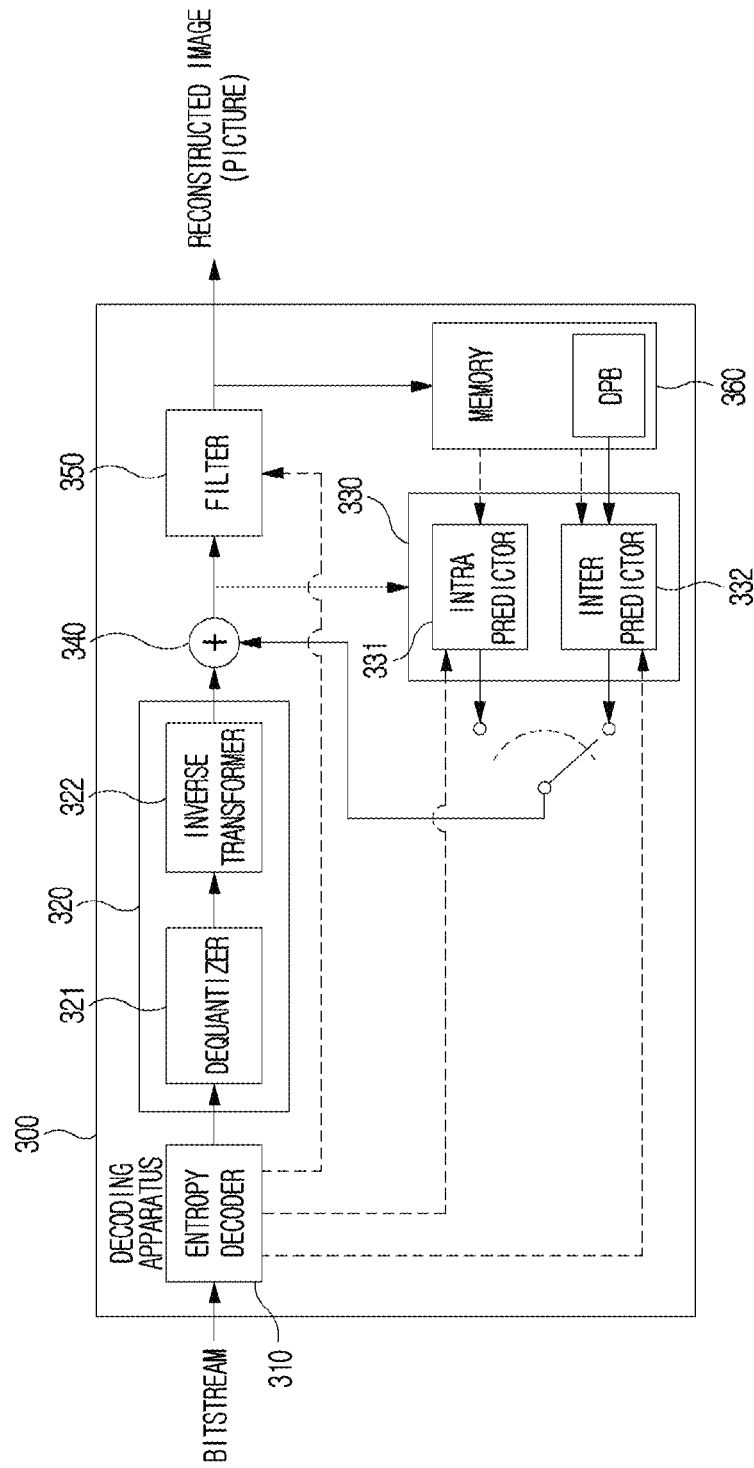
FIG. 3 is a schematic diagram illustrating a configuration of a video/image decoding apparatus to which the embodiments of the present disclosure may be applied.

FIG. 3 is a schematic diagram illustrating a configuration of a video/image decoding apparatus to which the embodiment(s) of the present disclosure may be applied.

Referring to FIG. 3, the decoding apparatus 300 may include an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350 may be configured by a hardware component (e.g., a decoder chipset or a processor) according to an embodiment. In addition, the memory 360 may include a decoded picture buffer (DPB) or may be configured by a digital storage medium. The hardware component may further include the memory 360 as an internal/external component.

When a bitstream including video/image information is input, the decoding apparatus 300 may reconstruct an image corresponding to a process in which the video/image information is processed in the encoding apparatus of FIG. 2. For example, the decoding apparatus 300 may derive units/blocks based on block partition related information obtained from the bitstream. The decoding apparatus 300 may perform decoding using a processor applied in the encoding apparatus. Thus, the processor of decoding may be a coding unit, for example, and the coding unit may be partitioned according to a quad tree structure, binary tree structure and/or ternary tree structure from the coding tree unit or the largest coding unit. One or more transform units may be derived from the coding unit. The reconstructed image signal decoded and output through the decoding apparatus 300 may be reproduced through a reproducing apparatus.

The decoding apparatus 300 may receive a signal output from the encoding apparatus of FIG. 2 in the form of a bitstream, and the received signal may be decoded through the entropy decoder 310. For example, the entropy decoder 310 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The decoding apparatus may further decode picture based on the information on the parameter set and/or the general constraint information. Signaled/received information and/or syntax elements described later in the present disclosure may be decoded may decode the decoding procedure and obtained from the bitstream. For example, the entropy decoder 310 decodes the information in the bitstream based on a coding method such as exponential Golomb coding, CAVLC, or CABAC, and output syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a decoding target block or information of a symbol/bin decoded in a previous stage, and perform an arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 310 may be provided to the predictor (the inter predictor 332 and the intra predictor 331), and the residual value on which the entropy decoding was performed in the entropy decoder 310, that is, the quantized transform coefficients and related parameter information, may be input to the residual processor 320. The residual processor 320 may derive the residual signal (the residual block, the residual samples, the residual sample array). In addition, information on filtering among information decoded by the entropy decoder 310 may be provided to the filter 350. Meanwhile, a receiver (not shown) for receiving a signal output from the encoding apparatus may be further configured as an internal/external element of the decoding apparatus 300, or the receiver may be a component of the entropy decoder 310. Meanwhile, the decoding apparatus according to the present disclosure may be referred to as a video/image/picture decoding apparatus, and the decoding apparatus may be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients and output the transform coefficients. The dequantizer 321 may rearrange the quantized transform coefficients in the form of a two-dimensional block form. In this case, the rearrangement may be performed based on the coefficient scanning order performed in the encoding apparatus. The dequantizer 321 may perform dequantization on the quantized transform coefficients by using a quantization parameter (e.g., quantization step size information) and obtain transform coefficients.

The inverse transformer 322 inversely transforms the transform coefficients to obtain a residual signal (residual block, residual sample array).

The predictor may perform prediction on the current block and generate a predicted block including prediction samples for the current block. The predictor may determine whether intra prediction or inter prediction is applied to the current block based on the information on the prediction output from the entropy decoder 310 and may determine a specific intra/inter prediction mode.

The predictor 320 may generate a prediction signal based on various prediction methods described below. For example, the predictor may not only apply intra prediction or inter prediction to predict one block but also simultaneously apply intra prediction and inter prediction. This may be called combined inter and intra prediction (CIIP). In addition, the predictor may be based on an intra block copy (IBC) prediction mode or a palette mode for prediction of a block. The IBC prediction mode or palette mode may be used for content image/video coding of a game or the like, for example, screen content coding (SCC). The IBC basically performs prediction in the current picture but may be performed similarly to inter prediction in that a reference block is derived in the current picture. That is, the IBC may use at least one of the inter prediction techniques described in the present disclosure. The palette mode may be considered as an example of intra coding or intra prediction. When the palette mode is applied, a sample value within a picture may be signaled based on information on the palette table and the palette index.

The intra predictor 331 may predict the current block by referring to the samples in the current picture. The referred samples may be located in the neighborhood of the current block or may be located apart according to the prediction mode. In the intra prediction, prediction modes may include a plurality of non-directional modes and a plurality of directional modes. The intra predictor 331 may determine the prediction mode applied to the current block by using a prediction mode applied to a neighboring block.

The inter predictor 332 may derive a predicted block for the current block based on a reference block (reference sample array) specified by a motion vector on a reference picture. In this case, in order to reduce the amount of motion information transmitted in the inter prediction mode, motion information may be predicted in units of blocks, sub-blocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 332 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 340 may generate a reconstructed signal (reconstructed picture, reconstructed block, reconstructed sample array) by adding the obtained residual signal to the prediction signal (predicted block, predicted sample array) output from the predictor (including the inter predictor 332 and/or the intra predictor 331). If there is no residual for the block to be processed, such as when the skip mode is applied, the predicted block may be used as the reconstructed block.

The adder 340 may be called reconstructor or a reconstructed block generator. The generated reconstructed signal may be used for intra prediction of a next block to be processed in the current picture, may be output through filtering as described below, or may be used for inter prediction of a next picture.

Meanwhile, luma mapping with chroma scaling (LMCS) may be applied in the picture decoding process.

The filter 350 may improve subjective/objective image quality by applying filtering to the reconstructed signal. For example, the filter 350 may generate a modified reconstructed picture by applying various filtering methods to the reconstructed picture and store the modified reconstructed picture in the memory 360, specifically, a DPB of the memory 360. The various filtering methods may include, for example, deblocking filtering, a sample adaptive offset, an adaptive loop filter, a bilateral filter, and the like.

The (modified) reconstructed picture stored in the DPB of the memory 360 may be used as a reference picture in the inter predictor 332. The memory 360 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 360 may store reconstructed samples of reconstructed blocks in the current picture and transfer the reconstructed samples to the intra predictor 331.

In the present disclosure, the embodiments described in the filter 260, the inter predictor 221, and the intra predictor 222 of the encoding apparatus 200 may be the same as or respectively applied to correspond to the filter 350, the inter predictor 332, and the intra predictor 331 of the decoding apparatus 300.

In the present disclosure, at least one of quantization/inverse quantization and/or transform/inverse transform may be omitted. When the quantization/inverse quantization is omitted, the quantized transform coefficients may be called transform coefficients. When the transform/inverse transform is omitted, the transform coefficients may be called coefficients or residual coefficients, or may still be called transform coefficients for uniformity of expression.

In the present disclosure, a quantized transform coefficient and a transform coefficient may be referred to as a transform coefficient and a scaled transform coefficient, respectively. In this case, the residual information may include information on transform coefficient(s), and the information on the transform coefficient(s) may be signaled through residual coding syntax. Transform coefficients may be derived based on the residual information (or the information on the transform coefficient(s)), and scaled transform coefficients may be derived by inverse transforming (scaling) on the transform coefficients. Residual samples may be derived based on the inverse transforming (transforming) on the scaled transform coefficients. This may be applied/expressed in other parts of the present disclosure as well.

On the other hand, a coded video sequence (CVS) may be defined as a sequence of AUs consisting of CVSS AUs followed by 0 or more AUs, which are not CVSS AUs (Coded Video Sequence Start Access Units), in decoding order. The AU following the CVSS may be an AU that includes all subsequent AUs but does not include subsequent AUs which are CVSS AUs. In addition, the CVSS AU may be limited that each existing picture unit (PU) is a coded layer video sequence start (CLVSS) PU, and the CLVSS PU may be an Intra Random Access Point (IRAP) PU with NoOutputBeforeRecoveryFlag of 1 or a Gradual Decoding Refresh (GDR) PU with NoOutputBeforeRecoveryFlag of 1. Also, there may be a restriction that each CVSS AU shall have a PU for each of the layers present in the CVS.

The definitions for the above-described CVS, AU, CVSS' AU, PU, CLVSS PU, IRAP PU, and GDR PU may be represented as shown in the following table.

TABLE 1

3.2 access unit (AU): A set of PUs that belong to different layers and contain coded pictures associated with the same time for output from the DPB.
3.30 coded layer video sequence start (CLVSS) PU: A PU in which the coded picture is a CLVSS picture.
3.35 coded video sequence (CVS): A sequence of AUs that consists, in decoding order, of a CVSS AU, followed by zero or more AUs that are not CVSS AUs, including all subsequent AUs up to but not including any subsequent AU that is a CVSS AU.
3.36 coded video sequence start (CVSS) AU: An IRAP AU or GDR AU for which the coded picture in each PU is a CLVSS picture.
3.56 gradual decoding refresh (GDR) AU: An AU in which there is a PU for each layer present in the CVS and the coded picture in each present PU is a GDR picture.
3.57 gradual decoding refresh (GDR) PU: A PU in which the coded picture is a GDR picture.
3.71 intra random access point (IRAP) AU: An AU in which there is a PU for each layer present in the CVS and the coded picture in each PU is an IRAP picture.
3.73 intra random access point (IRAP) PU: A PU in which the coded picture is an IRAP picture.
3.105 picture unit (PU): A set of NAL units that are associated with each other according to a specified classification rule, are consecutive in decoding order, and contain exactly one coded picture.

Meanwhile, the existing VVC standard working draft (WD) for CVSS AU including GDR PU may have at least the following problems.

First, the current requirement that each CVSS AU shall be completed (that is, the requirement that each CVSS AU shall include a PU for each of the existing layers) may be to avoid layer step-wise output. That is, at the start of the decoding process, a higher layer, which is an output layer, may have no picture to output, whereas a lower layer, possibly not an output layer, may have a picture to output. The above goal cannot be achieved unless recovery point pictures associated with the GDR pictures of each layer are regulated.

Second, if the reason for requiring the CVSS AU to have a picture of each of the existing layers is to avoid layer-phased output, the constraint may be unnecessarily too strict. That is, the constraint shall be applied only to the output layer of the Output Layer Set (OLS).

Accordingly, the present disclosure proposes embodiments as described below in order to solve the above-described problems. The proposed embodiments may be applied individually or in combination.

As an embodiment, when the GDR AU is a CVSS AU, an embodiment in which the AU is limited to have a GDR PU for each existing layer in OLS being decoded may be proposed. That is, according to this embodiment, when the GDR AU is a CVSS AU, the AU may be limited to have a GDR PU for each existing layer of OLS being decoded.

In addition, as another embodiment, when the AU is a CVSS AU, an embodiment in which the AU is limited to have a PU for each output layer in the OLS being decoded may be proposed. That is, according to this embodiment, when the AU is a CVSS AU, the AU may be limited to have a PU for each output layer in the OLS being decoded. This embodiment relaxes the constraint of the existing VVC standard WD in which CVSS AU shall be completed.

In addition, in another embodiment, when an IRAP AU (that is, an AU having the same NAL unit type of a specific IRAP where all PUs are CRA_NUT, IDR_W_RADL, or IDR_N_LP according to the current video/image standard) is the first AU for decoding (i.e., CVSS AU), an embodiment in which at least one of the following is satisfied may be proposed. That is, according to this embodiment, when an IRAP AU (that is, an AU having the same NAL unit type of a specific IRAP in which all PUs are CRA_NUT, IDR_W_RADL or IDR_N_LP according to the current video/image standard) is the first AU for decoding (i.e., CVSS AU), at least one of the following may be satisfied.
- a) AU has a PU of each layer present in the bitstream (i.e., OLS being decoded).
- b) AU has a PU of each of the independent layer or at least the lowest layer of the bitstream/OLS being decoded. In addition, in the case of a layer that have no PU in the AU, the PU of the first AU following the AU in the decoding order and including the PU of the corresponding layer shall be the same IRAP PU as the PU of the CVSS AU.

In addition, in another embodiment, when an IRAP AU (that is, an AU having the same NAL unit type of a specific IRAP where all PUs are CRA_NUT, IDR_W_RADL, or IDR_N_LP according to the current video/image standard) is the first AU for decoding (i.e., CVSS AU), an embodiment in which at least one of the following is satisfied may be proposed. That is, according to this embodiment, when an IRAP AU (that is, an AU having the same NAL unit type of a specific IRAP where all PUs are CRA_NUT, IDR_W_RADL or IDR_N_LP according to the current video/image standard) is the first AU for decoding (i.e., CVSS AU), at least one of the following may be satisfied.
- a) AU has a PU of each layer present in the bitstream (i.e., OLS being decoded).
- b) AU has a PU of each of the independent layer or at least the lowest layer of the bitstream/OLS being decoded. In addition, in the case of a layer that have no PU in the AU, the PU of the first AU following the AU in the decoding order and including the PU of the corresponding layer shall be an IRAP PU. (That is, the PU of the first AU may be of a different IRAP PU type, and does not need to be the same IRAP PU as the PU of the CVSS AU).

In addition, as another embodiment, when a GDR AU (i.e., an AU in which all PUs are GDR PUs) is the first AU for decoding (i.e., CVSS AU), an embodiment in which at least one of the following is satisfied may be proposed. That is, according to this embodiment, when a GDR AU (i.e., an AU in which all PUs are GDR PUs) is the first AU for decoding (i.e., CVSS AU), at least one of the following may be satisfied.
- a) AU has a PU of each layer (i.e., OLS being decoded) present in the bitstream.
- b) AU has a PU of each of the independent layer or at least the lowest layer of the bitstream/OLS being decoded. In addition, in the case of a layer that have no PU in the AU, the PU of the first AU following the AU in the decoding order and including the PU of the corresponding layer shall be a GDR PU.

In addition, in another embodiment, when the CVSS AU is an incomplete IRAP AU or a GDR AU (that is, the AU includes a missing PU of one or more layers), an embodiment in which at least one of the following is satisfied may be proposed. That is, according to this embodiment, when the CVSS AU is an incomplete IRAP AU or a GDR AU (that is, the AU includes a missing PU of one or more layers), at least one of the following may be satisfied.
- a) A previous AU (previous AU) in decoding order includes the EOS NAL unit of each layer present in the OLS being decoded.
- b) The AU includes an Access Unit Delimiter (AUD) including a flag indicating that the AU is an IRAP AU or a GDR AU.

In addition, as another embodiment, when a GDR AU (i.e., an AU in which all PUs are GDR PUs) is the first AU for decoding (i.e., CVSS AU), an embodiment in which at least one of the following is satisfied may be proposed. That is, according to this embodiment, when a GDR AU (i.e., an AU in which all PUs are GDR PUs) is the first AU for decoding (i.e., CVSS AU), at least one of the following may be satisfied.
- a) AU has a PU of each layer present in the bitstream (i.e., OLS being decoded).
- b) AU has a PU of each of the independent layer or at least the lowest layer of bitstream/OLS being decoded. In addition, in the case of a layer that have no PU in the AU, the PU of the first AU following the AU in the decoding order and including the PU of the corresponding layer shall be a GDR PU or an IRAP PU.

Also, as another embodiment, in the case of GDR AU, an embodiment in which a recovery point picture related to a GDR PU of each layer shall be aligned may be proposed. That is, according to the present embodiment, in the case of GDR AU, it may be restricted that a recovery point picture related to the GDR PU of each layer shall be aligned. In other words, according to the present embodiment, there may be an AU in which all pictures of the corresponding AU are recovery point pictures related to the PU of the GDR AU.

Also, as another embodiment, when it is a GDR PU of a GDR AU and the layer of the PU is not an independent layer, an embodiment in which a syntax element for signaling a recovery point POC value does not exist may be proposed. That is, according to this embodiment, when it is a GDR PU of a GDR AU and the layer of the PU is not an independent layer, a syntax element for signaling a recovery point POC value may not exist.

In addition, in another embodiment, in the case of GDR AU, the recovery point picture related to the GDR PU of a specific layer other than the first layer of the bitstream is a recovery point related to the GDR PU of a lower layer in output order. An embodiment may be proposed in which it is limited not to precede the picture. That is, according to this embodiment, in the case of GDR AU, it may be limited that the recovery point picture related to the GDR PU of a specific layer other than the first layer of the bitstream shall not precede the recovery point picture related to the GDR PU of the lower layer in output order.

In addition, in another embodiment, in the case of GDR AU, an embodiment in which the recovery point picture related to the GDR PU of a specific layer other than the first layer of the bitstream shall not follow the recovery point picture related to the GDR PU of a lower layer in output order may be proposed. That is, according to this embodiment, in the case of GDR AU, it may be limited that the recovery point picture related to the GDR PU of a specific layer other than the first layer of the bitstream shall not follows the recovery point picture related to the GDR PU of a lower layer in output order.

As an embodiment, the above-described embodiments may be implemented as shown in a table to be described later. The implementation may be represented based on the existing VVC standard specification.

In addition, for example, referring to Table 2, when the GDR AU is a CVSS AU, for each layer which does not have

TABLE 2 gradual decoding refresh (GDR) AU: An AU in which the coded picture in each present
PU is a GDR picture.
gradual decoding refresh (GDR) PU: A PU in which the coded picture is a GDR picture.
intra random access point (IRAP) AU: An AU in which the coded picture in each present
PU is an IRAP picture.
intra random access point (IRAP) PU: A PU in which the coded picture is an IRAP
picture.
Order of AUs and their association to CVSs
A bitstream consists of one or more CVSs.
A CVS consists of one or more AUs. The order of PUs and their association to AUs are
described in clause 7.4.2.4.3.
The first AU of a CVS is a CVSS AU, wherein each present PU is a CLVSS PU, which is
either an IRAP PU with NoOutputBeforeRecoveryFlag equal to 1 or a GDR PU with
NoOutputBeforeRecoveryFlag equal to 1.
When an IRAP AU is an CVSS AU, for each layer in which there is no PU in the AU, it is
constrained that the PU in that layer in the first AU that follow the IRAP AU in decoding
order shall be an IRAP PU.
Note: random access to an AU containing an IRAP PU (e.g., IRAP PU in the lowest layer
only but the rest of the PU in the AU is not IRAP PU) is possible, In such case, for each layer
for which the AU does not have IRAP PU, an external entity need to remove non-IRAP PU
in each of AU starting from the AU until the the first AU that contains an IRAP PU and
follow the AU in decoding order.
When a GDR AU is an CVSS AU, for each layer in which there is no PU in the AU, it is
constrained that the PU in that layer in the first AU that follow the GDR AU in decoding
order shall be a GDR PU.
Note: random access to an AU containing a GDR PU (e.g., GDR PU in the lowest layer only
but the rest of the PU in the AU is not GDR PU) is possible. In such case, for each layer for
which the AU does not have GDR PU, an external entity need to remove non-IRAP PU or
non-GDR PU in each of AU starting from the AU until the the first AU that contains an
IRAP PU or GDR PU and follow the AU in decoding order.
When the current AU is a CVSS AU that is not a complete IRAP AU or GDR AU (i.e., the
AU has one or more PU not present in its existing layer), it is constrained that the AU that
immidiately precede the AU shall contains EOS NAL unit in each layer present in the OLS
being decoded.

For example, referring to Table 2, an IRAP AU may be an AU in which the coded picture of each existing PU is an IRAP picture. In the existing VVC standard, an IRAP AU may be defined as an AU in which there is a PU for each layer in the CVS, and a coded picture of each existing PU is an IRAP picture. That is, according to Table 2 described above, the constraint that the IRAP AU has a PU for each layer in the CVS may be deleted.

Also, for example, referring to Table 2, in relation to the order of AUs and their association to CVSs, the constraint that each CVSS AU shall have a PU for each layer present in the CVS may be deleted. The order of AUs and their association to CVSs of the existing VVC standard discloses that each CVSS AU shall have a PU for each layer present in the CVS. On the contrary, referring to Table 2, the constraint that each CVSS AU shall have a PU for each layer present in CVS may be deleted (that is, among PUs for each layer existing in the CVS, there may be a PU that is not in each CVSS AU).

Also, for example, referring to Table 2, when the IRAP AU is the CVSS AU, for each layer which does not have a PU in the AU, it may be limited that a PU of the corresponding layer in the first AU following the IRAP AU in decoding order shall be the IRAP PU.

Also, for example, referring to Table 2, random access for an AU including an IRAP PU (that is, the PU of the lowest layer is an IRAP PU, but the remaining PU is not an IRAP PU) may be possible. In this case, for each layer in which the AU does not have an IRAP PU, an external entity needs to remove the non-IRAP PU of each AU from the AU to the first AU including the IRAP PU and following the AU in decoding order.

a PU in the AU, it may be limited that the PU of the corresponding layer in the first AU following the GDR AU in decoding order shall be a GDR PU.

In addition, for example, referring to Table 2, random access for an AU including a GDR PU (that is, the PU of the lowest layer is a GDR PU, but the remaining PU is not a GDR PU) may be possible. In this case, for each layer in which the AU does not have a GDR PU, an external entity needs to remove the non-IRAP PU or the non-GDR PU of each AU from the AU to the first AU including the GDR PU and following the AU in decoding order.

Also, for example, referring to Table 2, when the current AU is a CVSS AU that is not a complete IRAP AU or a complete GDR AU (i.e., when the AU has one or more PUs that do not exist in the existing layer), an AU immediately preceding the AU may be constrained to include the EOS NAL unit of each layer present in the OLS being decoded.

FIG. 4 schematically illustrates an image encoding method by an encoding apparatus according to the present disclosure. The method disclosed in FIG. 4 may be performed by the encoding apparatus disclosed in FIG. 2. Specifically, for example, S700 of FIG. 4 may be performed by the DPB of the encoding apparatus, and S710 to S730 may be performed by the entropy encoder of the encoding apparatus. In addition, although not shown, the process of performing the DPB management process may be performed by the DPB of the encoding apparatus, and the process of decoding the current picture may be performed by the predictor and the residual processor of the encoding apparatus.

The encoding apparatus decodes the current picture of a Coded Video Sequence Start (CVSS) AU (S400). The encoding apparatus may decode the current picture of the CVSS AU.

For example, the encoding apparatus may determine whether to perform inter prediction or intra prediction on a block of a current picture, and may determine the specific inter prediction mode or the specific intra prediction mode based on the RD cost. According to the determined mode, the encoding apparatus may derive prediction samples for the current block, and may derive the residual samples by subtracting the prediction samples from the original samples of the block of the current picture. Meanwhile, for example, the encoding apparatus may generate a reconstructed sample and/or a reconstructed picture through addition of the prediction sample and the residual sample for the block of the current picture.

The encoding apparatus encodes a bitstream for a Coded Video Sequence (CVS) including the CVSS AU (S410). The encoding apparatus may encode a bitstream for a Coded Video Sequence (CVS) including the CVSS AU. For example, the bitstream may include image information. For example, the encoding apparatus may generate and encode prediction-related information and/or residual information for a block of the current picture, and the image information may include the prediction-related information and/or the residual information. Also, for example, the encoding apparatus may encode image information and output it in the form of a bitstream.

Here, the coded video sequence (CVS) may be defined as a sequence of AUs consisting of CVSS AUs followed by 0 or more AUs, which are not CVSS AUs (Coded Video Sequence Start Access Units), in decoding order. The AU following the CVSS may be an AU that includes all subsequent AUs but does not include subsequent AUs which are CVSS AUs. Also, for example, the CVSS AU may be a Gradual Decoding Refresh (GDR) AU or an Intra Random Access Point (IRAP) AU including a Coded Layer Video Sequence Start (CLVSS) PU. The CLVSS PU may be an Intra Random Access Point (IRAP) PU having NoOutputBeforeRecoveryFlag of 1 or a Gradual Decoding Refresh (GDR) PU having NoOutputBeforeRecoveryFlag of 1. That is, for example, the CLVSS PU may be a PU in which the coded picture in the PU is an Intra Random Access Point (IRAP) picture having NoOutputBeforeRecoveryFlag of 1 or a Gradual Decoding Refresh (GDR) picture having NoOutputBeforeRecoveryFlag of 1. In other words, the CLVSS PU may be the first PU of the layer of the bitstream in decoding order or the first PU of the layer of the bitstream that follows the EOS NAL unit of the layer in decoding order.

For example, the CVSS AU may include a picture unit (PU) for each of the layers of the bitstream. That is, for example, the CVSS AU may include a PU for each of the layers of an output layer set (OLS) being decoded.

Alternatively, as an example, the CVSS AU may include only a picture unit (PU) for an output layer of an output layer set (OLS) of the CVS. That is, for example, the CVSS AU may include only a picture unit (PU) for an output layer of an output layer set (OLS) being decoded in the bitstream. For example, the CVSS AU may not include a PU of a layer other than the output layer of the OLS. Also, for example, when the CVSS AU is an Intra Random Access Point (IRAP) AU, the CVSS AU may include a PU for an independent layer or at least the lowest layer of the OLS. An PU of a specific layer of a specific AU may be an IRAP PU of the same type as the IRAP PU of the CVSS AU, and the specific AU may be the first AU including the PU of the specific layer that follows the CVSS AU in decoding order. The specific layer may be a layer for a PU not included in the CVSS AU. Alternatively, for example, when the CVSS AU is an Intra Random Access Point (IRAP) AU, the CVSS AU may include a PU for an independent layer or at least the lowest layer of the OLS. An PU of a specific layer of a specific AU may be the same type or a different type of IRAP PU as the IRAP PU of the CVSS AU. The specific AU may be the first AU including the PU of the specific layer that follows the CVSS AU in decoding order. The specific layer may be a layer for a PU not included in the CVSS AU. Here, for example, the type of the IRAP PU may be CRA_NUT, IDR_W_RADL, or IDR_N_LP. Also, for example, when the CVSS AU is a Gradual Decoding Refresh (GDR) AU, the CVSS AU may include a PU for an independent layer or at least the lowest layer of the OLS. An PU of a specific layer of a specific AU may be a GDR PU, and the specific AU may be the first AU including the PU of the specific layer following the CVSS AU in decoding order. The specific layer may be a layer for a PU not included in the CVSS AU. Alternatively, for example, when the CVSS AU (i.e., CVSS AU that does not include a PU of at least one layer of the bitstream) is an Intra Random Access Point (IRAP) AU or a Gradual Decoding Refresh (GDR) AU, an AU preceding the CVSS AU in decoding order may include an EOS NAL unit of each of the layers present in the OLS being decoded (i.e., the layers present in the bitstream). Alternatively, for example, when the CVSS AU (i.e., CVSS AU that does not include a PU of at least one layer of the bitstream) is an Intra Random Access Point (IRAP) AU or a Gradual Decoding Refresh (GDR) AU, the CVSS AU may include an access unit delimiter (AUD) including a flag indicating whether the CVSS AU is an IRAP AU or a GDR AU. Alternatively, for example, when the CVSS AU (i.e., CVSS AU that does not include a PU of at least one layer of the bitstream) is an Intra Random Access Point (IRAP) AU or a Gradual Decoding Refresh (GDR) AU, an AU preceding the CVSS AU in decoding order may include an EOS NAL unit of each of the layers present in the OLS being decoded (i.e., the layers present in the bitstream). The CVSS AU may include an access unit delimiter (AUD) including a flag indicating whether the CVSS AU is an IRAP AU or a GDR AU. Also, for example, when the CVSS AU is a Gradual Decoding Refresh (GDR) AU, the CVSS AU may include a PU for an independent layer or at least the lowest layer of the OLS. An PU of a specific layer of a specific AU may be an IRAP PU or a GDR PU, and the specific AU may be the first AU including the PU of the specific layer following the CVSS AU in decoding order. The specific layer may be a layer for a PU not included in the CVSS AU.

Meanwhile, for example, for GDR AU, a recovery point picture related to a GDR PU of each layer of the bitstream may be aligned. That is, for example, there may be an AU in which the pictures in the AU are recovery point pictures related to the PU of the GDR AU. In other words, for example, the bitstream may include an AU in which all pictures are recovery point pictures related to the PU of the GDR AU.

Alternatively, for example, for GDR AU, when the layer of the GDR PU of the GDR AU is not an independent layer, a syntax element indicating the value of POC of the recovery point picture may not exist, and the value of POC of the recovery point picture may be inferred to be equal to the value of POC of the recovery point picture of the GDR PU in the reference layer. That is, for example, there may be no syntax element indicating the value of POC of the recovery point picture for the GDR PU of a layer other than the independent layer of the GDR AU, and the value of POC of the recovery point picture may be derived equal to the value of POC of the recovery point picture of the GDR PU in the reference layer.

Alternatively, for example, for GDR AU, the recovery point picture related to the GDR PU of a specific layer other than the first layer of the bitstream may not precede the recovery point picture related to the GDR PU of the lowest layer in the output order. That is, for example, the recovery point picture related to the GDR PU of the specific layer other than the first layer of the bitstream in a Gradual Decoding Refresh (GDR) AU may not precede the recovery point picture related to the GDR PU of the lowest layer in output order.

Alternatively, for example, for GDR AU, the recovery point picture related to the GDR PU of the specific layer other than the first layer of the bitstream may not follow the recovery point picture related to the GDR PU of the lowest layer in output order. That is, for example, the recovery point picture related to the GDR PU of the specific layer other than the first layer of the bitstream in the Gradual Decoding Refresh (GDR) AU may not follow the recovery point picture related to the GDR PU of the lowest layer in output order.

Meanwhile, the encoding apparatus may generate reconstructed samples and/or a reconstructed picture through addition of the prediction samples and the residual samples. As described above, an in-loop filtering procedure such as deblocking filtering, SAO, and/or ALF procedure may be applied to the reconstructed samples to improve subjective/objective picture quality if necessary.

Meanwhile, the bitstream including the image information may be transmitted to the decoding apparatus through a network or (digital) storage medium. Here, the network may include a broadcasting network and/or a communication network, and the digital storage medium may include various storage media such as USB, SD, CD, DVD, Blu-ray, HDD, SSD, and the like.

FIG. 5 briefly illustrates an encoding apparatus for performing an image encoding method according to the present disclosure. The method disclosed in FIG. 4 may be performed by the encoding apparatus illustrated in FIG. 5. Specifically, for example, the predictor and the residual processor of the encoding apparatus of FIG. 5 may perform S400, and the entropy encoder of the encoding apparatus of FIG. 5 may perform S410.

FIG. 6 briefly illustrates an image decoding method performed by a decoding apparatus according to the present disclosure. The method disclosed in FIG. 6 may be performed by the decoding apparatus illustrated in FIG. 3. Specifically, for example, S600 to S610 of FIG. 6 may be performed by the entropy decoder of the decoding apparatus, and S620 of FIG. 6 may be performed by the predictor and the residual processor of the decoding apparatus.

The decoding apparatus obtains a bitstream for a Coded Video Sequence (CVS) including a Coded Video Sequence Start (CVSS) Access Unit (AU) (S600). The decoding apparatus may obtain a bitstream for a Coded Video Sequence (CVS) including a Coded Video Sequence Start (CVSS) Access Unit (AU) (CVS).

Here, the coded video sequence (CVS) may be defined as a sequence of AUs consisting of CVSS AUs followed by 0 or more AUs, which are not CVSS AUs (Coded Video Sequence Start Access Units), in decoding order. The AU following the CVSS may be an AU that includes all subsequent AUs but does not include subsequent AUs which are CVSS AUs. Also, for example, the CVSS AU may be a Gradual Decoding Refresh (GDR) AU or an Intra Random Access Point (IRAP) AU including a Coded Layer Video Sequence Start (CLVSS) PU. The CLVSS PU may be an Intra Random Access Point (IRAP) PU having NoOutputBeforeRecoveryFlag of 1 or a Gradual Decoding Refresh (GDR) PU having NoOutputBeforeRecoveryFlag of 1. That is, for example, the CLVSS PU may be a PU in which the coded picture in the PU is an Intra Random Access Point (IRAP) picture having NoOutputBeforeRecoveryFlag of 1 or a Gradual Decoding Refresh (GDR) picture having NoOutputBeforeRecoveryFlag of 1. In other words, the CLVSS PU may be the first PU of the layer of the bitstream in decoding order or the first PU of the layer of the bitstream that follows the EOS NAL unit of the layer in decoding order.

For example, the CVSS AU may include a picture unit (PU) for each of the layers of the bitstream. That is, for example, the CVSS AU may include a PU for each of the layers of an output layer set (OLS) being decoded.

Alternatively, as an example, the CVSS AU may include only a picture unit (PU) for an output layer of an output layer set (OLS) of the CVS. That is, for example, the CVSS AU may include only a picture unit (PU) for an output layer of an output layer set (OLS) being decoded in the bitstream. For example, the CVSS AU may not include a PU of a layer other than the output layer of the OLS. Also, for example, when the CVSS AU is an Intra Random Access Point (IRAP) AU, the CVSS AU may include a PU for an independent layer or at least the lowest layer of the OLS. An PU of a specific layer of a specific AU may be an IRAP PU of the same type as the IRAP PU of the CVSS AU, and the specific AU may be the first AU including the PU of the specific layer that follows the CVSS AU in decoding order. The specific layer may be a layer for a PU not included in the CVSS AU. Alternatively, for example, when the CVSS AU is an Intra Random Access Point (IRAP) AU, the CVSS AU may include a PU for an independent layer or at least the lowest layer of the OLS. An PU of a specific layer of a specific AU may be the same type or a different type of IRAP PU as the IRAP PU of the CVSS AU. The specific AU may be the first AU including the PU of the specific layer that follows the CVSS AU in decoding order. The specific layer may be a layer for a PU not included in the CVSS AU. Here, for example, the type of the IRAP PU may be CRA_NUT, IDR_W_RADL, or IDR_N_LP. Also, for example, when the CVSS AU is a Gradual Decoding Refresh (GDR) AU, the CVSS AU may include a PU for an independent layer or at least the lowest layer of the OLS. An PU of a specific layer of a specific AU may be a GDR PU, and the specific AU may be the first AU including the PU of the specific layer following the CVSS AU in decoding order. The specific layer may be a layer for a PU not included in the CVSS AU. Alternatively, for example, when the CVSS AU (i.e., CVSS AU that does not include a PU of at least one layer of the bitstream) is an Intra Random Access Point (IRAP) AU or a Gradual Decoding Refresh (GDR) AU, an AU preceding the CVSS AU in decoding order may include an EOS NAL unit of each of the layers present in the OLS being decoded (i.e., the layers present in the bitstream). Alternatively, for example, when the CVSS AU (i.e., CVSS AU that does not include a PU of at least one layer of the bitstream) is an Intra Random Access Point (IRAP) AU or a Gradual Decoding Refresh (GDR) AU, the CVSS AU may include an access unit delimiter (AUD) including a flag indicating whether the CVSS AU is an IRAP AU or a GDR AU. Alternatively, for example, when the CVSS AU (i.e., CVSS AU that does not include a PU of at least one layer of the bitstream) is an Intra Random Access Point (IRAP) AU or a Gradual Decoding Refresh (GDR) AU, an AU preceding the CVSS AU in decoding order may include an EOS NAL unit of each of the layers present in the OLS being decoded (i.e., the layers present in the bitstream). The CVSS AU may include an access unit delimiter (AUD) including a flag indicating whether the CVSS AU is an IRAP AU or a GDR AU. Also, for example, when the CVSS AU is a Gradual Decoding Refresh (GDR) AU, the CVSS AU may include a PU for an independent layer or at least the lowest layer of the OLS. An PU of a specific layer of a specific AU may be an IRAP PU or a GDR PU, and the specific AU may be the first AU including the PU of the specific layer following the CVSS AU in decoding order. The specific layer may be a layer for a PU not included in the CVSS AU.

Meanwhile, for example, for GDR AU, a recovery point picture related to a GDR PU of each layer of the bitstream may be aligned. That is, for example, there may be an AU in which the pictures in the AU are recovery point pictures related to the PU of the GDR AU. In other words, for example, the bitstream may include an AU in which all pictures are recovery point pictures related to the PU of the GDR AU.

Alternatively, for example, for GDR AU, when the layer of the GDR PU of the GDR AU is not an independent layer, a syntax element indicating the value of POC of the recovery point picture may not exist, and the value of POC of the recovery point picture may be inferred to be equal to the value of POC of the recovery point picture of the GDR PU in the reference layer. That is, for example, there may be no syntax element indicating the value of POC of the recovery point picture for the GDR PU of a layer other than the independent layer of the GDR AU, and the value of POC of the recovery point picture may be derived equal to the value of POC of the recovery point picture of the GDR PU in the reference layer.

Alternatively, for example, for GDR AU, the recovery point picture related to the GDR PU of a specific layer other than the first layer of the bitstream may not precede the recovery point picture related to the GDR PU of the lowest layer in the output order. That is, for example, the recovery point picture related to the GDR PU of the specific layer other than the first layer of the bitstream in a Gradual Decoding Refresh (GDR) AU may not precede the recovery point picture related to the GDR PU of the lowest layer in output order.

Alternatively, for example, for GDR AU, the recovery point picture related to the GDR PU of the specific layer other than the first layer of the bitstream may not follow the recovery point picture related to the GDR PU of the lowest layer in output order. That is, for example, the recovery point picture related to the GDR PU of the specific layer other than the first layer of the bitstream in the Gradual Decoding Refresh (GDR) AU may not follow the recovery point picture related to the GDR PU of the lowest layer in output order.

The decoding apparatus derives image information for a current picture of the CVSS AU based on the bitstream (S610). The decoding apparatus may derive image information for the current picture of the CVSS AU from the bitstream. For example, the bitstream may include image information for the current picture. The image information may include prediction-related information and/or residual information for a block in the current picture.

The decoding apparatus decodes the current picture based on the image information (S620). For example, the decoding apparatus may derive a prediction mode for a block in the current picture based on prediction-related information included in the image information, and may derive a prediction sample by performing inter prediction or intra prediction for the block in the current picture based on the prediction mode. Also, for example, the decoding apparatus may derive a residual sample for the block in the current picture based on residual information included in the image information, and may generate a reconstructed sample and/or a reconstructed picture through addition of the prediction sample and the residual sample.

As described above, an in-loop filtering procedure such as deblocking filtering, SAO, and/or ALF procedure may be applied to the reconstructed samples in order to improve subjective/objective picture quality as necessary thereafter.

FIG. 7 briefly illustrates a decoding apparatus for performing an image decoding method according to the present disclosure. The method disclosed in FIG. 6 may be performed by the decoding apparatus illustrated in FIG. 7. Specifically, for example, the entropy decoder of the decoding apparatus of FIG. 7 may perform S600 to S610 of FIG. 6, and the predictor and the residual processor of the decoding apparatus of FIG. 7 may perform S620 of FIG. 6.

According to the above-described present disclosure, instead of including PUs of all layers, CVSS AU may not include PUs of layers other than the output layer of OLS, thereby avoiding layer step-wise output.

Also, according to the present disclosure, the PU of the first AU including the PU of the layer for the PU that is not included in the CVSS AU following the CVSS AU that is a GDR AU or an IRAP AU may be a GDR PU or an IRAP PU. In this way, layer step-wise output can be avoided, and the overall coding efficiency can be improved.

In the above-described embodiment, the methods are described based on the flowchart having a series of steps or blocks. The present disclosure is not limited to the order of the above steps or blocks. Some steps or blocks may occur simultaneously or in a different order from other steps or blocks as described above. Further, those skilled in the art will understand that the steps shown in the above flowchart are not exclusive, that further steps may be included, or that one or more steps in the flowchart may be deleted without affecting the scope of the present disclosure.

The embodiments described in this specification may be performed by being implemented on a processor, a microprocessor, a controller or a chip. For example, the functional units shown in each drawing may be performed by being implemented on a computer, a processor, a microprocessor, a controller or a chip. In this case, information for implementation (e.g., information on instructions) or algorithm may be stored in a digital storage medium.

In addition, the decoding apparatus and the encoding apparatus to which the present disclosure is applied may be included in a multimedia broadcasting transmission/reception apparatus, a mobile communication terminal, a home cinema video apparatus, a digital cinema video apparatus, a surveillance camera, a video chatting apparatus, a real-time communication apparatus such as video communication, a mobile streaming apparatus, a storage medium, a camcorder, a VoD service providing apparatus, an Over the top (OTT) video apparatus, an Internet streaming service providing apparatus, a three-dimensional (3D) video apparatus, a teleconference video apparatus, a transportation user equipment (e.g., vehicle user equipment, an airplane user equipment, a ship user equipment, etc.) and a medical video apparatus and may be used to process video signals and data signals. For example, the Over the top (OTT) video apparatus may include a game console, a blue-ray player, an internet access TV, a home theater system, a smart phone, a tablet PC, a Digital Video Recorder (DVR), and the like.

Furthermore, the processing method to which the present disclosure is applied may be produced in the form of a program that is to be executed by a computer and may be stored in a computer-readable recording medium. Multimedia data having a data structure according to the present disclosure may also be stored in computer-readable recording media. The computer-readable recording media include all types of storage devices in which data readable by a computer system is stored. The computer-readable recording media may include a BD, a Universal Serial Bus (USB), ROM, PROM, EPROM, EEPROM, RAM, CD-ROM, a magnetic tape, a floppy disk, and an optical data storage device, for example. Furthermore, the computer-readable recording media includes media implemented in the form of carrier waves (e.g., transmission through the Internet). In addition, a bitstream generated by the encoding method may be stored in a computer-readable recording medium or may be transmitted over wired/wireless communication networks.

In addition, the embodiments of the present disclosure may be implemented with a computer program product according to program codes, and the program codes may be performed in a computer by the embodiments of the present disclosure. The program codes may be stored on a carrier which is readable by a computer.

FIG. 11 illustrates a structural diagram of a contents streaming system to which the present disclosure is applied.

The content streaming system to which the embodiment(s) of the present disclosure is applied may largely include an encoding server, a streaming server, a web server, a media storage, a user device, and a multimedia input device.

The encoding server compresses content input from multimedia input devices such as a smartphone, a camera, a camcorder, etc. Into digital data to generate a bitstream and transmit the bitstream to the streaming server. As another example, when the multimedia input devices such as smartphones, cameras, camcorders, etc. directly generate a bitstream, the encoding server may be omitted.

The bitstream may be generated by an encoding method or a bitstream generating method to which the embodiment(s) of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server delivers it to a streaming server, and the streaming server transmits multimedia data to the user. In this case, the content streaming system may include a separate control server. In this case, the control server serves to control a command/response between devices in the content streaming system.

The streaming server may receive content from a media storage and/or an encoding server. For example, when the content is received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (ex. Smartwatches, smart glasses, head mounted displays), digital TVs, desktops computer, digital signage, and the like. Each server in the content streaming system may be operated as a distributed server, in which case data received from each server may be distributed.

The claims described in the present disclosure may be combined in various ways. For example, the technical features of the method claims of the present disclosure may be combined to be implemented as an apparatus, and the technical features of the apparatus claims of the present disclosure may be combined to be implemented as a method. In addition, the technical features of the method claim of the present disclosure and the technical features of the apparatus claim may be combined to be implemented as an apparatus, and the technical features of the method claim of the present disclosure and the technical features of the apparatus claim may be combined to be implemented as a method.

The invention claimed is:

1. An image decoding method performed by a decoding apparatus, the method comprising:
obtaining a bitstream for a Coded Video Sequence (CVS) including a Coded Video Sequence Start (CVSS) Access Unit (AU);
deriving image information on a current picture of the CVSS AU based on the bitstream; and
decoding the current picture based on the image information,
wherein the CVSS AU includes only a Picture Unit (PU) for an output layer of an Output Layer Set (OLS) of the CVS,
wherein the CVSS AU includes a PU for an independent layer of the OLS, and
wherein a first PU of a specific layer, which corresponds to a layer having no PU in the CVSS AU, in a specific AU following the CVSS AU in a decoding order is an Intra Random Access Point (IRAP) PU based on the CVSS AU being an IRAP AU including the layer having no PU or a Gradual Decoding Refresh (GDR) PU based on the CVSS AU being a GDR AU including the layer having no PU.

2. The method of claim 1, wherein, based on the CVSS AU being the IRAP AU including the layer having no PU or the GDR AU including the layer having no PU, an AU preceding the CVSS AU in a decoding order includes an EOS NAL unit of each of the layers present in the OLS being decoded.

3. The method of claim 1, wherein, based on the CVSS AU being the IRAP AU including the layer having no PU or the GDR AU including the layer having no PU, the CVSS AU includes an Access Unit Delimiter (AUD) including a flag indicating whether the CVSS AU is the IRAP AU or the GDR AU.

4. An image encoding method performed by an encoding apparatus, the method comprising:
encoding image information; and
outputting a bitstream for a Coded Video Sequence (CVS) of the image information, the CVS including a Coded Video Sequence Start (CVSS) Access Unit (AU),
wherein the CVSS AU includes only a Picture Unit (PU) for an output layer of an Output Layer Set (OLS) of the CVS,
wherein the CVSS AU includes a PU for an independent layer of the OLS, and
wherein a first PU of a specific layer, which corresponds to a layer having no PU in the CVSS AU, in a specific AU following the CVSS AU in a decoding order is an Intra Random Access Point (IRAP) PU based on the CVSS AU being an IRAP AU including the layer having no PU or a Gradual Decoding Refresh (GDR) PU based on the CVSS AU being a GDR AU including the layer having no PU.

5. A method comprising:

generating a bitstream for a Coded Video Sequence (CVS) including a Coded Video Sequence Start (CVSS) Access Unit (AU); and transmitting the bitstream, wherein the CVSS AU includes only a Picture Unit (PU) for an output layer of an Output Layer Set (OLS) of the CVS, wherein the CVSS AU includes a PU for an independent layer of the OLS, and wherein a first PU of a specific layer, which corresponds to a layer having no PU in the CVSS AU, in a specific AU following the CVSS AU in a decoding order is an Intra Random Access Point (IRAP) PU based on the CVSS AU being an IRAP AU including the layer having no PU or a Gradual Decoding Refresh (GDR) PU based on the CVSS AU being a GDR AU including the layer having no PU.

* * * * *